United States Patent Office 2,871,337
Patented Jan. 27, 1959

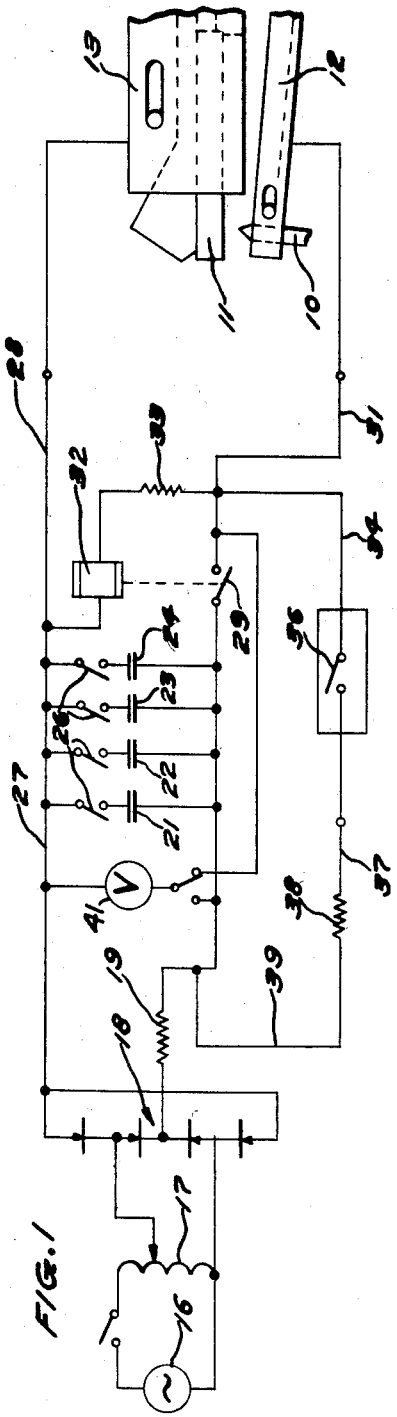
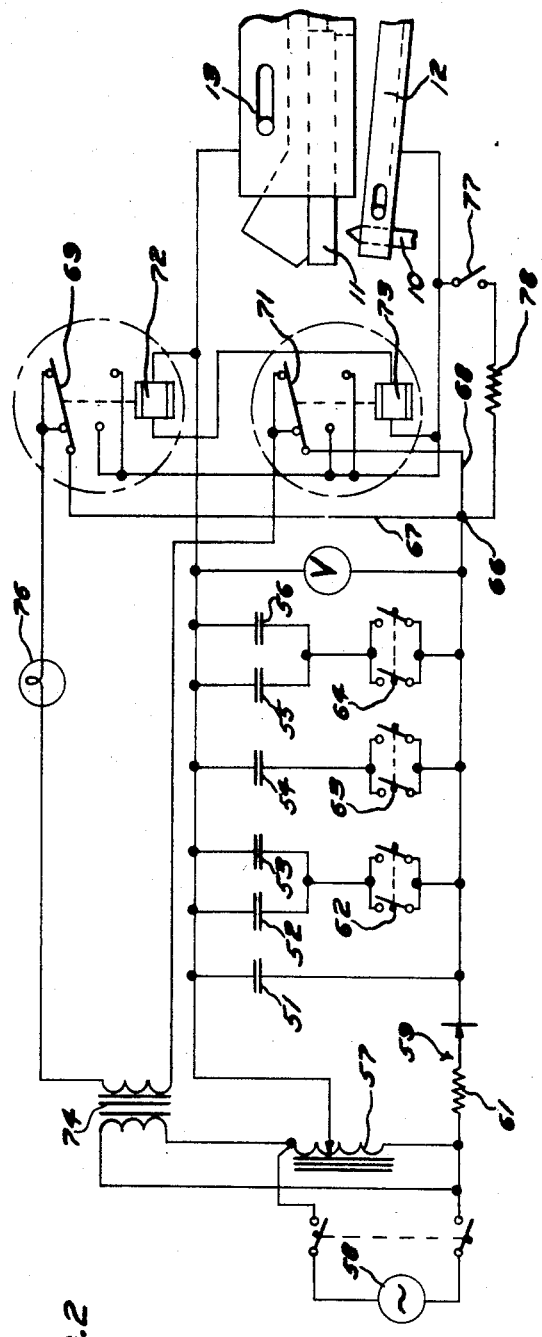

2,871,337

ELECTRICAL CONTROL SYSTEM FOR PERCUSSION WELDER

Kenneth F. Johnson, Oak Lawn, and Amos L. Quinlan, La Grange Park, Ill., assignors to Western Electric Company, Incorporated, New York, N. Y., a corporation of New York Application February 26, 1957, Serial No. 642,608

6 Claims. (Cl. 219—113)

This invention relates to control circuits for percussion welders, and more particularly to an electrical system for controlling the application of welding energy wherein facilities are provided to eliminate any possibility of the destruction or damage of any of the welding equipment or of the control system therefor.

In the operation of one type of low voltage percussion welding equipment, an electrical terminal is gripped and held stationary by a first holder electrically connected to a source of stored electrical energy and a pointed wire to be welded to the terminal is gripped by a movably mounted second holder that is selectively connected through a switch to the source of stored electrical energy. Thereafter the second holder is moved toward the first and the switch is closed to connect the source of energy across the terminal and the wire. As the wire approaches and contacts the terminal, an arc is established to fuse and weld the wire to the terminal. It has been found that if the wire touches the terminal prior to the closure of the switch, the resultant sudden surge of current from the source of stored energy causes burning, fusing or other destructive results to sections of the control circuit presenting resistance to the flow of current. More specifically, it has been found that the terminal holders are damaged or the contacts of the switch are fused or the insulation on the conductors in the control circuit is burned or destroyed or any combination of the above occurs.

It is a primary object of the present invention to provide a control circuit for low voltage percussion welding equipment having facilities therein for precluding any resulting damage or destruction of any component circuit elements that have current impressed therethrough.

Another object of the invention is the provision of a welder control circuit wherein premature contact of the elements to be welded results in the preclusion of subsequent application of the welding voltage and current.

A further object of the invention resides in an economical relay circuit for selectively applying energy from a storage circuit to a pair of elements to be welded.

With these and other objects in view, the present invention contemplates in one embodiment thereof a pair of article holders one of which is movable toward the other to carry an article to be welded into percussive engagement with an article held by the other holder. Energy for effectuating a weld is selectively applied from a storage circuit through a relay controlled contact. This relay coil is connected in parallel with the articles to be welded. Upon occurrence of a premature contact between the articles, the relay coil is short-circuited, and hence, precluded from operation thus preventing the application of the stored energy and thereby eliminating possible damage to the components connected in the electrical system.

Other objects and advantages of the present invention will be apparent from the following detailed description when considered in conjunction with the accompanying drawing, wherein Fig. 1 is a circuit diagram illustrating a selectively operable control circuit for applying welding energy to a welder embodying the principal features of the invention, and Fig. 2 is a circuit diagram of a circuit similar to that shown in Fig. 1 embodying certain additional features of the present invention.

Referring to Fig. 1, there is shown a wire 10 having a conically pointed end that is to be welded to a terminal 11. Wire 10 is securely mounted within a movable holder 12 that functions to advance the wire into engagement with the terminal. Terminal 11 is securely mounted in a fixed holder 13. It has been found that when a relatively low voltage of between 30 and 100 volts is impressed between the wire 10 and the terminal 11, and the wire 10 is moved into percussive engagement with the terminal 11, the metal of both the wire and terminal at the point of contact is fused and the elements are welded together.

Electrical energy for effectuating a weld is derived from an A. C. source 16 and impressed on an inductive voltage regulator 17. Output from the voltage regulator is impressed through a rectifier circuit generally designated by the reference numeral 18. Current flowing through the rectifier 18 also passes through a charging resistance 19 connected in parallel across a series of capacitors 21, 22, 23 and 24. Each capacitor is connected through a switch 26 to a lead 27 connected to the low potential side of the rectifier 18. By selectively connecting different patterns of the switches 26, different patterns of capacitors are connected across the resistance 19 to provide charging circuits of different capacitance.

A lead 28 connects the low voltage side of the capacitors to the terminal holder 13. The high voltage sides of the capacitors are connected through a normally open contact 29 and a lead 31 to the wire holder 12. Interconnected between the leads 28 and 31 and in parallel with the capacitors, the wire holder 12 and terminal holder 13, is a circuit including a relay coil 32 for controlling the actuation of the contacts 29. Connected in series with the relay 32 is a relatively high current limiting resistor 33. When relay coil 32 is actuated and the capacitors 21, 22, 23 and 24 are charged, the contact 29 closes to apply a surge of welding current to the wire holder 12 and terminal holder 13, and if the wire is in close proximity to the terminal 11, an arc will be struck to effectuate a melting of the tip of the wire 10 and a portion of the terminal 11 in register with the tip. Upon further movement of the wire 10, the metal of the wire and the metal of the terminal are fused to effectuate a weld.

In order to operate the relay coil 32, a circuit is provided that includes a lead 34, a manually operated switch 36, a lead 37, a current limiting resistor 38 and a lead 39. It will be noted that this circuit is connected in parallel across the contacts 29, and upon closure of the switch 36, current is permitted to flow through this circuit and through the relay 32 to close the contacts 29 and apply the welding energy to effectuate a weld between the wire 10 and the terminal 11. The particular means for effectuating a movement of the wire holder 12 is immaterial to a consideration of the present invention; however, it is contemplated that upon closure of the switch 36 suitable mechanical means are rendered effective to move the wire holder 12 and the wire toward the terminal 11. In normal operation, the closure of the switch 36 is effected as the wire 10 approaches terminal 11 and the relay 37 is energized to close the contact 29. When the wire 10 approaches the terminal 11 so that resistance of the air gap therebetween is sufficiently reduced, the capacitors 21 to 24 will discharge causing an arc to be established between the wire 10 and terminal 11 to effectuate the fusing of the wire tip and the area of the terminal is in register with the wire tip.

If for some reason or other, such as improper functioning of the mechanical mechanism for advancing the wire, the wire 10 is moved into contact with the terminal 11 prior to the closure of the switch 36 and the energization of the relay coil 32, then a shunt circuit will be completed around the relay coil 32. Inasmuch as the wire 10 contacts the terminal 11, a low resistance exists therethrough to preclude the flow of adequate current through the relay coil 32 to effectuate an operation thereof. The contact 29 is thereby held open thus precluding the application of stored energy from the capacitors 21—24. If the contact 29 were not provided and the closure of a switch directly connected the capacitors 21—24 across the engaged wire 10 and terminal 11, a surge of current of considerable magnitude would pass through the elements of the circuit, and any element thereof presenting resistance to the flow of current would be rapidly heated or destroyed or severely damaged. This damage could occur in the wire holder 12 or the terminal holder 13. A voltmeter 41 is connected across the leads 27 and 31 to give an indication of the voltage applied from the capacitors across the elements to be welded.

Referring to Fig. 2, there is shown a group of capacitors 51—56 adapted to be charged through a voltage regulator 57 connected to a suitable source of power 58. Again a rectifier circuit, in this instance, designated by the reference numeral 59, is provided to rectify voltage prior to application to the capacitors. A charging resistance 61 similar to charging resistor 19 in Fig. 1 is provided for establishing the voltage applied across the capacitors. Capacitors 52—56 are connected to double contact switches 62, 63 and 64 whereby the effective capacitance of the charging circuit may be varied. Again it is contemplated that a wire 10 will be held by a holder 12 capable of movement to bring the wire into engagement with a terminal 11 held by a stationary holder 13. The high potential side of the charging circuit is connected through a junction point 66 to a pair of leads 67 and 68 terminating at contacts 69 and 71 of sealed tubular mercury wetted contact relays 72 and 73, respectively.

When contacts 69 and 71 engage the upper fixed contacts as shown in Fig. 2, a circuit is completed from the secondary of a transformer 74, through an indicating lamp 76, through the contact 69 over the lead 67, through junction point 66, over lead 68 through contact 71 and back to the secondary of the transformer 74. The lamp 76 is thereby illuminated to indicate that the charge on the capacitors 51—56 has not been applied between the wire 10 and the terminal 11.

When it is desired to apply the charge on the capacitors across wire 10 and the terminal 11, a switch 77 is closed thereby completing a circuit through a current limiting resistor 78 and windings of the relays 72 and 73 causing said relays to draw up the contacts 69 and 71 into engagement with the lower fixed pairs of contacts. As the switch 77 is closed, suitable mechanical means (not shown) are rendered effective to initiate movement of the wire holder 12 and the wire 10 toward the terminal 11. The high potential side of the capacitors 51—56 are now connected through junction point 66 and contacts 69 and 71 in engagement with the lower contacts to the wire holder 12. The low potential sides of the capacitors are permanently connected to the terminal holder 13; consequently, the capacitors will discharge through the wire 10 and terminal 11 as the wire is moved into engagement with the terminal. As the point of the wire moves into very close proximity to the terminal 11, an arc is established to melt and fuse the point thereof, and also melts the metal on the terminal in register with the point. Further movement of the wire holder 12 effectuates a fusing together of the wire and terminal to complete the weld. It will be noted that double contacts are provided in every instance where the welding currents flows, thus eliminating points of resistance in the circuit which might otherwise be damaged upon the discharge of the capacitors. The current utilized in the present system is in the vicinity of from 500–800 amperes; consequently, every precaution must be taken to preclude developments of any points of high resistance in the welding circuit other than at the point where the weld is to be accomplished. If the wire 10 engages the terminal 11 prior to the closure of the switch 77, a low resistance shunt is provided through the engaged wire and terminal to preclude the subsequent energization of the relays 73 and 72. Upon subsequent closure of the switch 77, current flow is through the low resistance path of the engaged wire and terminal rather than high resistance path provided by the resistance 78 and the windings of relays 72 and 73. Inasmuch as the relay 73 does not operate, the capacitors are not discharged and possible damage to the circuit components and other elements connected to the circuit is avoided.

It is to be understood that the above-described arrangements of circuits and construction of circuits and other elemental parts are simply illustrative of an application of the principles of the invention and many other modifications may be made without departing from the invention.

What is claimed is:

1. In a percussion welding apparatus having facilities for moving a pair of articles into percussive engagement, a charged circuit, a circuit including normally open contacts interconnecting said charged circuit with said facilities, means for closing said contacts, and means rendered effective by the engagement of the articles for precluding operation of said closing means.

2. A welding apparatus having a pair of holders movable toward each other to bring a pair of articles carried thereby into engagement which comprises a capacitance circuit, means for charging said capacitance circuit, a circuit including normally open contacts interconnecting said holders and said capacitance circuit, a relay circuit for closing said contacts as the article holders move the articles into engagement, and means rendered effective by the articles engaging each other for precluding operation of said relay.

3. In a percussion welding apparatus, a pair of holders for moving articles toward and into engagement with each other, a capacitor discharge circuit connected in parallel with said article holders, normally open contacts interposed between said article holders and said discharge circuit, a relay for closing said contacts, a circuit including said relay and a current limiting resistor connected in parallel with said article holders, and means for energizing said relay only when the articles are spaced apart by the article holders.

4. In a percussion welding apparatus having facilities for moving a pair of articles into percussive engagement, a capacitance circuit, means for charging said capacitance circuit, an indicator circuit having contacts therein, an energy transfer circuit having contacts interconnecting said capacitance circuit with said article moving facilities, a contactor movable between a normal position closing said contacts in said indicating circuit and a drawn up position closing said transfer circuit contacts, means for drawing up said contactor, and means rendered effective by the engagement of said articles for precluding operation of said drawing up means.

5 In a control circuit for percussive welders having means for moving a pair of articles into percussive engagement, a capacitor circuit, means for selectively varying the capacitance of said capacitor circuit, means for supplying charging energy to said capacitor circuit, an indicator circuit operated by said charging means, two sets of contacts in said indicator circuit, contactors normally positioned to close said sets of contacts, a circuit including two sets of contacts for applying energy from said capacitor circuit to said pair of articles, relays for moving said contactors from the contacts in the indicator circuit to close the contacts in the energy applying circuits, and means for precluding the operation of the relays upon the articles being moved into engagement.

6. In a percussion welding apparatus having facilities for gripping and moving a pair of articles into percussive engagement, comprising a source of welding energy, a circuit including normally open contacts interconnecting said source of welding energy and said gripping facilities, a relay circuit for closing said contacts as the gripping facilities move the articles into engagement, and means rendered effective by the articles engaging each other for precluding operation of said relay.

References Cited in the file of this patent
UNITED STATES PATENTS

| | | |
|---|---|---|
| 2,486,274 | Graham | Oct. 25, 1949 |
| 2,510,101 | Graham | June 6, 1950 |